United States Patent
Laufer et al.

(10) Patent No.: US 9,321,879 B2
(45) Date of Patent: Apr. 26, 2016

(54) METHODS FOR CONTROLLING (EXTENDING) THE POT LIFE IN CHAIN-EXTENDED POLYURETHANE (PU)-BASED SYSTEMS

(71) Applicant: Rhein Chemie Rheinau GmbH, Mannheim (DE)

(72) Inventors: Wilhelm Laufer, Ellerstadt (DE); Armin Eckert, Oberhausen-Rheinhausen (DE); Uwe Haas, Wernau/N. (DE); Uwe Wuertz, Schriesheim (DE)

(73) Assignee: Rhein Chemie Rheinau, GmbH, Mannheim (DE)

( * ) Notice: Subject to any disclaimer, the term of this patent is extended or adjusted under 35 U.S.C. 154(b) by 0 days.

(21) Appl. No.: 14/398,372

(22) PCT Filed: Mar. 22, 2013

(86) PCT No.: PCT/EP2013/056153
§ 371 (c)(1),
(2) Date: Oct. 31, 2014

(87) PCT Pub. No.: WO2013/164134
PCT Pub. Date: Nov. 7, 2013

(65) Prior Publication Data
US 2015/0126688 A1    May 7, 2015

(30) Foreign Application Priority Data
May 3, 2012 (EP) ..................................... 12166641

(51) Int. Cl.
| | | |
|---|---|---|
| *C08G 18/72* | (2006.01) | |
| *C08G 18/79* | (2006.01) | |
| *C08G 18/66* | (2006.01) | |
| *C08G 18/76* | (2006.01) | |
| *C08G 18/77* | (2006.01) | |
| *C08G 18/02* | (2006.01) | |
| *C08G 18/10* | (2006.01) | |
| *C08G 18/42* | (2006.01) | |
| *C08G 18/24* | (2006.01) | |
| *C08K 5/29* | (2006.01) | |

(52) U.S. Cl.
CPC ............ *C08G 18/797* (2013.01); *C08G 18/025* (2013.01); *C08G 18/10* (2013.01); *C08G 18/242* (2013.01); *C08G 18/42* (2013.01); *C08G 18/4238* (2013.01); *C08G 18/664* (2013.01); *C08G 18/7621* (2013.01); *C08G 18/7671* (2013.01); *C08G 18/775* (2013.01); *C08G 18/776* (2013.01); *C08K 5/29* (2013.01)

(58) Field of Classification Search
CPC ...... C08G 18/10; C08G 18/42; C08G 18/025; C08G 18/242; C08G 18/664; C08G 18/775; C08G 18/776; C08G 18/797; C08G 18/7621; C08G 18/7671; C08K 5/29
See application file for complete search history.

(56) References Cited

U.S. PATENT DOCUMENTS

| | | |
|---|---|---|
| 3,406,197 A | 10/1968 | Ulrich |
| 3,406,198 A | 10/1968 | Budnick |
| 3,522,303 A | 7/1970 | Ulrich |
| 4,088,665 A | 5/1978 | Findeisen et al. |
| 4,294,719 A | 10/1981 | Wagner et al. |
| 4,321,394 A | 3/1982 | Schafer et al. |
| 5,686,552 A | 11/1997 | Masuda et al. |
| 6,124,398 A | 9/2000 | Imashiro et al. |
| 6,153,718 A | 11/2000 | Imashiro et al. |
| 6,258,917 B1 * | 7/2001 | Slagel ............................ 528/64 |
| 2010/0229945 A1 | 9/2010 | Suzuta et al. |

FOREIGN PATENT DOCUMENTS

EP    0850985 A1    7/1998

OTHER PUBLICATIONS

Szycher, M.; Szycher's Handbook of Polyurethanes, 1999, p. 2-1 to 2-13.*
European Search Report from Application EP12166641 dated Sep. 4, 2012, 4 pages.
International Search Report from Application WO/EP2013/056153 dated Jun. 5, 2013, 5 pages.

* cited by examiner

Primary Examiner — Robert Jones, Jr.

(57) ABSTRACT

The invention relates to novel processes for controlling (extending) the pot life in polyurethane (PU) based systems that are chain-extended with diamines, preferably PU elastomers, PU adhesives, PU casting resins.

8 Claims, No Drawings

METHODS FOR CONTROLLING (EXTENDING) THE POT LIFE IN CHAIN-EXTENDED POLYURETHANE (PU)-BASED SYSTEMS

The invention relates to novel processes for controlling (extending) the pot life in polyurethane (PU) based systems that are chain-extended with diamines, preferably PU elastomers, PU adhesives and PU casting resins.

Polyurethanes are formed, almost quantitatively by polyaddition reaction of polyisocyanates with polyhydric alcohols, i.e. polyols. Linking ensues by the reaction of an isocyanate group (—N=C=O) of one molecule with a hydroxyl group (—OH) of another molecule to form a urethane group (—NH—CO—O—).

The course of the reaction between the diisocyanate and the polyol depends on the molar ratio between the components. Intermediate products having a desirable average molecular weight and desirable end groups may well be formed. These intermediate products can then be chain extended later by reaction with a diol or diamine to form the desired polyurethane or polyurethane-polyurea hybrid. These intermediate products are generally known as prepolymers.

Suitable polyols for forming prepolymers include not only diols but also polyalkylene glycol ethers, polyether esters or polyesters having terminal hydroxyl groups (polyester polyols).

Polyester polyols are preferably used to form polyurethanes designed to have high mechanical or dynamical fatigue resistance.

The polyether esters or polyesters with terminal hydroxyl groups that are formed by polycondensation of simple dials and carboxylic acids still contain free carboxylic acids. These catalyse the reaction between the free isocyanate groups in the prepolymer and the chain-extending diamine, and this leads to short pot lives and makes the reaction uncontrollable. They further frequently have a low level of hydrolysis resistance.

Currently commercially available carbodiimides, as described in EP-A 0799843, are too sluggish for rapid acid removal within the target time for the production of prepolymers, or insufficiently soluble to be practical and economical.

The problem addressed by the present invention was therefore that of providing processes for controlling (extending) the pot life in polyurethane (PU) based systems that are chain-extended with diamines, in particular for the production of PU elastomers, PU adhesives or PU casting resins, while eschewing materials that are costly and inconvenient to produce.

Pot life for the purposes of the invention is the processing time of reactive materials. It is the time between the incipient mixing of a multi-component substance and the end of the workability thereof.

The problem was surprisingly solved by the process of the present invention in which specified carbodiimides are added to the polyol.

The present invention accordingly provides a process for extending the pot life in polyurethane (PU) based systems that are chain-extended with diamines, in which
at least one carbodiimide of formula (I)

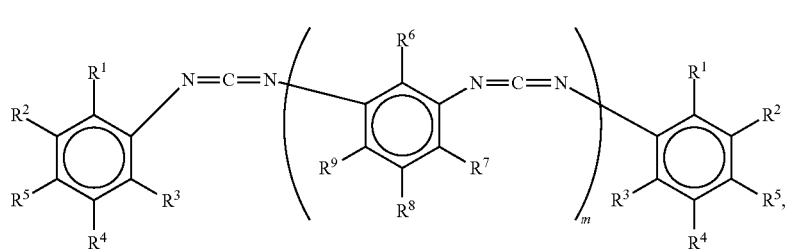

where m is 0-10,
$R^1$, $R^3$ and $R^5$ are each independently H or methyl,
$R^2$ and $R^4$ are each independently H, methyl, NH—C(O)—$OR^{10}$, where
$R^{10}$ is $C_1$-$C_4$-alkyl or —$(CH_2)_h$—O—$[(CH_2)_k$—O$]_g$—$R^{11}$, where h is 1-3, k is 1-3, g is 0-12 and $R^{11}$ is H or $C_1$-$C_4$-alkyl,
and $R^6$, $R^7$, $R^8$ and $R^9$ are each independently H or methyl, and
at least one diisocyanate and at least one diamine are stirred into
at least one polyol selected from the group of polyester polyols and/or polyetherester polyols,
at temperatures in the range from 40 to 130° C.

In a preferred embodiment of the invention, m is 0 and
$R^1$, $R^3$ and $R^5$ are each independently H or methyl,
$R^2$ and $R^4$ are each independently H, methyl or —NH—C(O)—$OR^{10}$, where $R^{10}$ is $C_1$-$C_4$-alkyl or —$(CH_2)_h$—O—$[(CH_2)_k$—O$]_g$—$R^{11}$, where h is 1-3, k is 1-3, g is 0-12 and $R^{11}$ is H or $C_1$-$C_4$-alkyl,
preferably $R^1$, $R^3$, $R^4$ and $R^5$ are each H or methyl, more preferably $R^1$, $R^3$ and $R^5$ are each methyl and $R^4$ is H,
$R^2$ is —NH—C(O)—$OR^{10}$, where $R^{10}$ is —$C_1$-$C_4$-alkyl or —$(CH_2)_h$—O—$[(CH_2)_k$—O$]_g$—$R^{11}$, where h is 1-3, k is 1-3, g is 0-12 and $R^{11}$ is H or $C_1$-$C_4$-alkyl.

It is very particularly preferable in the case of m=0 when $R^1$ is methyl and $R^2$, $R^3$, $R^4$ and $R^5$ are each H.

It is likewise highly preferable in the case of m=0 when
$R^3$ or $R^5$ is methyl or H,
$R^2$ is —NH—C(O)—$OR^{10}$, where $R^{10}$ is —$C_1$-$C_4$-alkyl or —$(CH_2)_h$—(O—$(CH_2)_k$—O$)_g$—$R^{11}$,
where h is 1-3, k is 1-3, g is 0-12 and $R^{11}$ is H or $C_1$-$C_4$-alkyl
and $R^1$ and $R^4$ are each H.

In a further likewise preferred embodiment of the invention, m is >0, more preferably m is 1, with $R^1$, $R^3$ and $R^5$ each independently being H or methyl, and $R^2$ and $R^4$ are each H, methyl or —NH—C(O)—OR$^{10}$, where $R^{10}$ is $C_1$-$C_4$-alkyl or

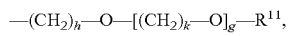
—(CH$_2$)$_h$—O—[(CH$_2$)$_k$—O]$_g$—R$^{11}$, where h is 1-3, k is 1-3, g is 0-12 and $R^{11}$ is H or $C_1$-$C_4$-alkyl, provided one or more of $R^6$, $R^7$, $R^8$ and $R^9$ are each independently H or methyl, preferably $R^1$, $R^3$, $R^4$ and $R^5$ are each H or methyl, more preferably $R^1$, $R^3$ and $R^5$ are each methyl and $R^4$ is H, $R^2$ and $R^4$ are each H, methyl or —NH—C(O)—OR$^{10}$, where $R^{10}$ is $C_1$-$C_4$-alkyl or

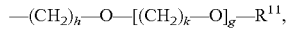
—(CH$_2$)$_h$—O—[(CH$_2$)$_k$—O]$_g$—R$^{11}$, where h is 1-3, k is 1-3, g is 0-12 and $R^{11}$ is H or $C_1$-$C_4$-alkyl, provided one or more of $R^6$, $R^7$, $R^8$ and $R^9$ are each independently H or methyl.

It is further preferable when $R^1$, $R^3$, $R^4$, $R^5$ are each H or methyl, more preferably methyl, $R^2$ is —NH—C(O)—OR$^{10}$, where $R^{10}$ is —$C_1$-$C_4$-alkyl or

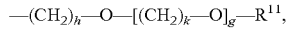
—(CH$_2$)$_h$—O—[(CH$_2$)$_k$—O]$_g$—R$^{11}$, where h is 1-3, k is 1-3, g is 0-12 and $R^{11}$ is H or $C_1$-$C_4$-alkyl, $R^6$, $R^7$, $R^8$ and $R^9$ are each independently H or methyl and more preferably at least one of $R^6$, $R^7$ and $R^9$ is methyl.

It is likewise highly preferable in the case of m=1 when $R^3$ or $R^5$ is methyl or H, $R^2$ is —NH—C(O)—OR$^{10}$, where $R^{10}$ is —$C_1$-$C_4$-alkyl or

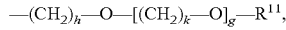
—(CH$_2$)$_h$—O—[(CH$_2$)$_k$—O]$_g$—R$^{11}$, where h is 1-3, k is 1-3, g is 0-12 and $R^{11}$ is H or $C_1$-$C_4$-alkyl, and $R^1$ and $R^4$ are each H and $R^6$, $R^7$, $R^8$ and $R^9$ are each independently H or methyl, preferably at least one of $R^6$, $R^7$ and $R^9$ is methyl.

In a preferred embodiment of the invention, at least one of $R^7$ and $R^9$ is methyl.

The compounds of formula (I) are commercially available substances in that they are available from Rhein Chemie Rheinau GmbH, for example, under the trade names Stabaxol® and Hycasyl® for example.

Preference is likewise given to mixtures of two or more carbodiimides of formula (I). In the case of as mixture, mean in can also be a fractional number.

Polyols for the purposes of the invention are selected from the group of polyester polyols and/or polyetherester polyols.

Polyester polyols and/or polyetherester polyols for the purposes of the invention are compounds with a molecular weight in g/mol of preferably up to 3000, more preferably in the range from 500 to 3000 and yet more preferably in the range from 1000 to 2000.

The term polyester polyol and/or polyetherester polyol is to be understood as meaning for the purposes of the present invention not only compounds having two or three hydroxyl groups per molecule but also compounds having more than three hydroxyl groups per molecule. Polyester polyols are preferred polyols.

It is advantageous for the polyol to have an OH number of up to 200, preferably between 20 and 150 and more preferably between 50 and 115.

Particularly suitable polyester polyols are reaction products of various diols with aromatic or aliphatic dicarboxylic acids and/or polymers of lactones.

Preference here is given to aromatic dicarboxylic acids useful for forming suitable polyester polyols. Particular preference is given here to terephthalic acid, isophthalic acid, phthalic acid, phthalic anhydride and also substituted dicarboxylic acid compounds having a benzene ring.

Useful aliphatic dicarboxylic acids are preferably those aliphatic dicarboxylic acids useful for forming suitable polyester polyols, more preferably sebacic acid, adipic acid and glutaric acid.

Preferred polymers of lactones are useful for forming suitable polyester polyols, more preferably polycaprolactone.

The dicarboxylic acids and the polymers of lactones are commercially available substances.

Particular preference is also given to those diols useful for forming suitable polyester polyols, most preferably ethylene glycol, butanediol, neopentyl glycol, hexanediol, propylene glycol, dipropylene glycol, diethylene glycol and cyclohexanedimethanol.

Preference for this is given to the reaction products of various aforementioned polyols with aromatic or aliphatic dicarboxylic acids and/or polymers of lactones (e.g. polycaprolactone).

The polyols used for the purposes of the inventions are commercially available compounds in that they are available from Bayer MaterialScience AG under the trade name of Desmophen®.

In a further embodiment of the invention, the composition additionally contains at least one diisocyanate.

Aromatic and aliphatic diisocyanates are preferred. Tolylene 2,4-diisocyanate, tolylene 2,6-diisocyanate, phenylene diisocyanate, 4,4-diphenylmethane diisocyanate, methylene bis(4-phenyl isocyanate), naphthalene 1,5-diisocyanate, tetramethylene 1,4-diisocyanate and/or hexamethylene 1,6-diisocyanate are particularly preferred and tolylene 2,4-diisocyanate and tolylene 2,6-diisocyanate are very particularly preferred.

The diisocyanates used for the purposes of the inventions are commercially available compounds in that they are available from Bayer MaterialScience AG under the trade name of Desmodur®.

In a further embodiment of the invention, the composition additionally contains at least one diamine.

Diamines, which are used for chain extension, are preferably 2-methylpropyl 3,5-diamino-4-chlorobenzoate, bis(4,4'-amino-3-chlorophenyl)methane, 3,5-dimethylthio-2,4-tolylenediamine, 3,5-dimethylthio-2,4-tolylenediamine, 3,5-diethyl-2,4-tolylenediamine, 3,5-diethyl-2,6-tolylenediamine, 4,4'-methylenebis(3-chloro-2,6-diethylaniline) and 1,3-propanediol bis(4-aminobenzoate).

The diamines used for chain extension within the meaning of the invention are commercially available compounds in that they are available from Rhein Chemie Rheinau GmbH under the trade name of Addolink®.

The ratio of carbodiimide to polyol is preferably 0.1-5, more preferably 1-3 parts by weight of carbodiimide per 100 parts by weight of polyol.

The ratio of diisocyanate to polyol is preferably 20-50:100 parts by weight, more preferably 30:100 parts by weight.

In those cases where the composition contains at least one diamine in addition to the polyester polyol and/or polyetherester polyol and the carbodiimide and also the diisocyanate, the amount of diamine is 5-30 wt %, based on the composition.

In the process of the present invention, the polyester polyol and/or polyetherester polyol is preferably initially charged and the carbodiimide conforming to formula (I) or a mixture of carbodiimides conforming to formula (I) is stirred thereinto.

The polyurethane (PU) based systems prepared by this process have increased hydrolysis resistance.

The purview of the invention encompasses all the moiety definitions, indices, parameters and explications recited hereinabove and hereinbelow in general terms or in preferred ranges in combination with one another, including that is in any desired combination of the respective ranges and preferred ranges.

The examples which follow are offered by way of elucidation not limitation of the invention.

WORKING EXAMPLES

The following substances were used in the examples which follow:

Desmophen® 2000MM, a linear polyester polyol having an OH number of 56 mg KOH/g and an acid number of 0.83 mg KOH/g, from Bayer MaterialScience AG.

A carbodiimide of formula (I) where m=0 and $R^1$=$CH_3$, $R^2$=H, $R^3$=H, $R^4$=H and $R^5$=H.

Stabaxol® P200, a polymeric aromatic carbodiimide based on tetramethylxylylene diisocyanate from Rhein Chemie Rheinau GmbH.

Stabaxol® I, a monomeric carbodiimide based on 2,6-diisopropylphenylene isocyanate from Rhein Chemie Rheinau GmbH.

Desmodur® T100, a 2,4-tolylene diisocyanate from Bayer Material Science.

Addolink® 1604, a 2-methylpropyl 3,5-diamino-4-chlorobenzoate from Rhein Chemie Rheinau GmbH as diamine component.

Carbodilite® HMV-8CA: a polymeric aliphatic carbodiimide from Nisshinbo Industries, INC.

The following mixtures were produced as follows:

Mixture A (comparator): 100 g of Desmophen® 2000MM were melted at 100° C.

Mixture B (for preparing mixture II of the present invention): 100 g of Desmophen® 2000MM were melted at 100° C. and admixed with 0.6 g of the carbodiimide of formula (I) where m=0 and $R^1$=$CH_3$, $R^2$=H, $R^3$=H, $R^4$=H and $R^5$=H.

Mixture C (comparator): 100 g of Desmophen® 2000MM were melted at 100° C. and admixed with 0.6 g of monomeric carbodiimide based on 2,6-diisopropylphenylene isocyanate (Stabaxol® P200).

Mixture D (comparator): 100 g of Desmophen® 2000MM were melted at 100° C. and admixed with 0.6 g of Carbodilite HMV8CA. The two substances cannot be mixed. So this mixture was not employable for further tests.

All particulars are in parts by weight, unless otherwise stated.

TABLE 1

| parts/ mixture No. | mixture A | mixture B | mixture C | Desmodur ® T100 | Addolink ® 1604 |
|---|---|---|---|---|---|
| I (c) | 100 | | | 21 | 16.16 |
| II (i) | | 100 | | 21 | 16.16 |
| III (c) | | | 100 | 21 | 16.16 | c = comparative example,
i = inventive example.

Mixtures A to C were reacted at temperatures of 80° C. with the amounts of Desmodur® T 100 which are indicated in table 1 to an isocyanate content of 5% and then with Addolink® 1604 chitin extender in the amount indicated in table 1. The pot life was determined for the mixture, which was initially liquid, became gelled after a few minutes and reacted to form a solid elastomer. The pot life is the time between a multi-component substance being mixed and ceasing to be workable. The values found are reported in table 2.

TABLE 2

| mixture | pot life in seconds |
|---|---|
| I | 240 |
| II | 370 |
| III | 340 |

It is clearly apparent from the value for mixture II that the mixture with the inventive carbodiimide of formula (I) where m=0 and $R^1$=$CH_3$, $R^2$=H, $R^3$=H, $R^4$=H and $R^5$=H results in a markedly extended pot life and thus in improved processability.

What is claimed is:
1. A process for extending the pot life of curable polyurethane (PU) based mixtures, the process comprising:
combining at least one carbodiimide of formula (I)

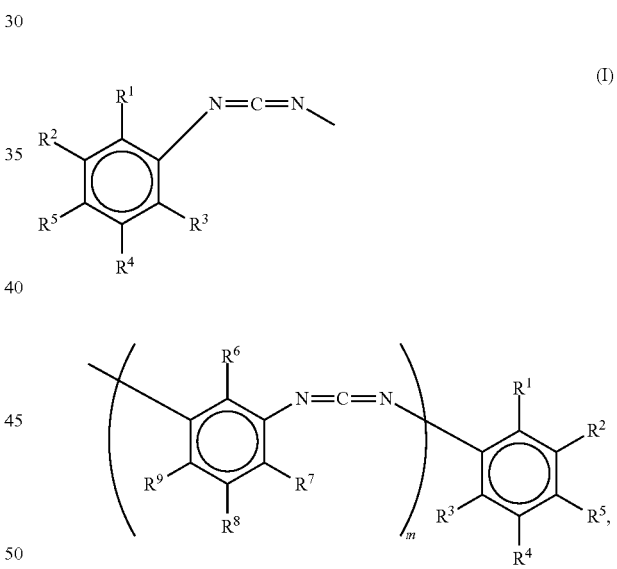

wherein:
m is >0,
$R^1$, $R^3$ and $R^5$ are each independently H or methyl,
$R^2$ and $R^4$ are each H, methyl or —NH—C(O)—$OR^{10}$, where $R^{10}$ is $C_1$-$C_4$-alkyl or —$(CH_2)_h$—O—$[(CH_2)_k$—$O]_g$—$R^{11}$, where h is 1-3, k is 1-3, g is 0-12 and $R^{11}$ is H or $C_1$-$C_4$-alkyl, and
one or more of $R^6$, $R^7$, $R^8$ and $R^9$ are each independently H or methyl,
at least one polyisocyanate,
a polyamine, and
at least one polyol selected from the group of polyester polyols and polyetherester polyols.

2. A process for extending the pot life of curable polyurethane (PU) based mixtures, the process comprising:
combining at least one carbodiimide of formula (I)

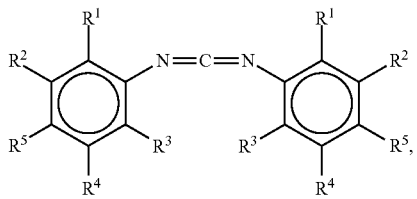

where:
R$^1$, R$^3$, R$^4$ and R$^5$ are each H or methyl, and
R$^2$ is —NH—C(O)—OR$^{10}$, where R$^{10}$ is —C$_1$-C$_4$-alkyl or —(CH$_2$)$_h$—O—[(CH$_2$)$_k$—O]$_g$—R$^{11}$, where h is 1-3, k is 1-3, g is 0-12 and R$^{11}$ is H or C$_1$-C$_4$-alkyl,
at least one polyisocyanate,
a polyamine, and
at least one polyol selected from the group of polyester polyols and polyetherester polyols.

3. The process according to claim 2, wherein R$^1$, R$^3$, and R$^5$ are each methyl, and R$^4$ is H.

4. A process for extending the pot life of curable polyurethane (PU) based mixtures, the process comprising:
combining at least one carbodiimide of formula (I)

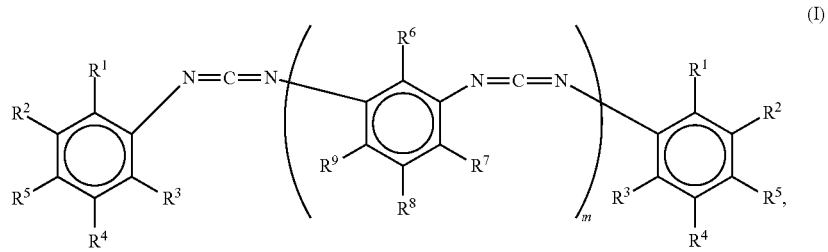

wherein:
m is >0,
R$^1$, R$^3$, R$^4$ and R$^5$ are each H or methyl,
R$^2$ is —NH—C(O)—OR$^{10}$, where R$^{10}$ is —C$_1$-C$_4$-alkyl or —(CH$_2$)$_h$—O—[(CH$_2$)$_k$—O]$_g$—R$^{11}$, where h is 1-3, k is 1-3, g is 0-12 and R$^{11}$ is H or C$_1$-C$_4$ alkyl, and R$^6$, R$^7$, R$^8$ and R$^9$ are each independently H or methyl,
at least one polyisocyanate,
a polyamine, and
at least one polyol selected from the group of polyester polyols and polyetherester polyols.

5. The process according to claim 4, wherein R$^1$, R$^3$ and R$^5$ are each methyl, R4 is H, and at least one of R$^5$, R$^7$ and R$^9$ is methyl.

6. The process according to claim 1, wherein:
the polyisocyanate is a diisocyanate;
the polyamine is a diamine; and
the carbodiimide, the diisocyanate, the diamine, and the polyol are combined at a temperature of 40° C. to 130° C.

7. The process according to claim 2, wherein:
the polyisocyanate is a diisocyanate;
the polyamine is a diamine; and
the carbodiimide, the diisocyanate, the diamine, and the polyol are combined at a temperature of 40° C. to 130° C.

8. The process according to claim 4, wherein:
the polyisocyanate is a diisocyanate;
the polyamine is a diamine; and
the carbodiimide, the diisocyanate, the diamine, and the polyol are combined at a temperature of 40° C. to 130° C.

* * * * *